US005257112A

United States Patent [19]

Okada

[11] Patent Number: 5,257,112

[45] Date of Patent: Oct. 26, 1993

[54] FACSIMILE MAIL SYSTEM WITH MAIL CENTER EQUIPMENT

[75] Inventor: Akihiro Okada, Kawasaki, Japan

[73] Assignee: Fujitsu Limited, Kawasaki, Japan

[21] Appl. No.: 929,170

[22] Filed: Aug. 11, 1992

[30] Foreign Application Priority Data

Aug. 14, 1991 [JP] Japan ................................ 3-204490

[51] Int. Cl.[5] ............................................ H04N 1/32

[52] U.S. Cl. .................................. 358/402; 358/407; 358/438; 358/440; 379/97; 379/100

[58] Field of Search ............... 358/402, 403, 407, 439, 358/434, 440, 436, 438, 442; 379/100

[56] References Cited

U.S. PATENT DOCUMENTS

| | | | |
|---|---|---|---|
| 4,941,170 | 7/1990 | Herbst | 358/402 |
| 5,065,254 | 11/1991 | Hishida | 358/402 |

FOREIGN PATENT DOCUMENTS

| | | |
|---|---|---|
| 0398184 | 11/1990 | European Pat. Off. . |
| 61-16667 | 1/1986 | Japan . |
| 61-148942 | 7/1986 | Japan . |
| 62-213467 | 9/1987 | Japan . |
| 3050932 | 3/1991 | Japan . |
| 3109854 | 5/1991 | Japan . |

OTHER PUBLICATIONS

"Sna Network Fax Gateway Conversions and Routing", IBM, Apr. 1991, vol. 33, Noll, pp. 479–480.

*Primary Examiner*—Edward L. Coles, Sr.
*Assistant Examiner*—Scott A. Rogers

[57] ABSTRACT

A facsimile mail system comprising mail center equipment, a plurality of telephone sets connected to the mail center equipment via lines and a telephone exchange, and a plurality of facsimile machines each connected to the respective telephone sets. Conditions for distributing received facsimile information are set beforehand per calling line. If facsimile information is transmitted by designation of a push-button signal, the information is distributed according to the instructions designated by the push-button signal; if facsimile information is transmitted by designation of an optical mark reader sheet, the information is distributed according to the instructions designated by that sheet. If neither push-button signal designation nor optical mark reader sheet designation is provided, the received information is automatically distributed as per the distribution conditions previously established for the calling line in question.

6 Claims, 6 Drawing Sheets

FIG.6

| Calling line number (37) | Log-in subscriber number (38) | Mail function (39) | Destination (40) |
|---|---|---|---|
| 1 | 30000 | 100 | #500##510#2391 #* |
| 2 | 30000 | 100 | 7113-2453##520#* |
| 3 | 30010 | 100 | #530#* |
| 4 | 30020 | 100 | 7000-1010#* |
| ~ | ~ | ~ | ~ |
| N | 30060 | 100 | #31000#* |

Function codes of facsimile mail
100 : ordinary mail
110 : special delivery
102 : ordinary mail, transmission information retained
112 : special delivery, transmission information retained
104 : ordinary mail, confidential
114 : special delivery, confidential
106 : ordinary mail, confidential, transmission information retained
116 : special delivery, confidential, transmission information retained

FACSIMILE MAIL SYSTEM WITH MAIL CENTER EQUIPMENT

BACKGROUND OF THE INVENTION

1. Field of the Invention

The present invention relates to a facsimile mail system and, more particularly, to a facsimile mail receiving system.

2. Description of the Related Art

Facsimile mail equipment established at a mail center is connected to a telephone exchange which in turn is connected to a plurality of subscriber facsimile machines (hereinafter called fax machines). The equipment is capable of broadcasting information simultaneously to a plurality of fax machines, storing in an appropriate order the information that may be received substantially at the same time, and transmitting the stored information to destinations in the order in which the information was received. Such facsimile mail equipment is included in a facsimile mail system that illustratively distributes in-house documents and slips within a corporation and, in the case of securities firms, sends securities-related information to subscribed customers.

Generally, there are three ways to utilize facsimile mail service. The first way is for the user to call up the mail center by telephone and input a push-button signal string (PB signal string) by operating push-buttons of the telephone set in accordance with a voice guidance sent from the mail center. The second way is for the user to attach an optical mark reader sheet (OMR sheet) to the first page of the document to be transmitted so that both the OMR sheet and the document will be sent together to the mail center. The third way is to designate before document transmission such conditions as a destination and a kind of service desired for each of the call receiving lines connected to the facsimile mail equipment set up at the mail center. When the user transmits by fax machine only a document with no specific PB signal-based or OMR sheet-based designation attached to it, the facsimile mail equipment forwards the document to the destination fax machines according to the previously established conditions.

Where the third way above is resorted to for the use of the mail service offered by the facsimile mail system, the system is easier to operate because the user need not perform PB signal- or OMR sheet-based pre-transmission designation. However, there are a number of disadvantages with the third way of making use of facsimile mail service. For example, the information received over a line for which facsimile-related conditions were previously established is processed solely according to the established conditions of that line. This means that the calling line is usable only under its established conditions and is not available for facsimile transmission based on the PB signal- or OMR sheet-based designation.

Another disadvantage is that it is necessary to perform bothersome, time-consuming chores of modifying line conditions of any line if any condition of that line needs to be changed. On the other hand, where the facsimile mail system is utilized on the basis of PB signal- or OMR sheet-based designation, it is impossible to make unconditional use of the system.

SUMMARY OF THE INVENTION

It is therefore an object of the present invention to provide a facsimile mail system which, given facsimile information not containing PB signal- or OMR sheet-based designation, automatically performs mail service processing under the conditions defined for the calling line, while still permitting facsimile mail service based on PB signal- or OMR sheet-based designation.

In accordance with an aspect of the present invention, there is provided a facsimile mail system having mail center equipment, a plurality of telephone sets connected to the mail center equipment via lines and a telephone exchange, and a plurality of facsimile machines each connected to the respective telephone sets, the facsimile mail system comprising: means for setting beforehand distribution condition information for facsimile information received per calling line; first storage means for storing the distribution condition information; means for recognizing a calling line; push-button signal recognizing means for recognizing push-button signal designation made by a telephone set; means for making automatic transition to optical mark reader sheet mode when the push-button signal recognizing means does not recognize any push-button signal designation within a predetermined time; recognition processing means for performing optical mark reader sheet recognition processing; receiving means for receiving the facsimile information; judging means for checking to see if, with the facsimile information received in full, the first page that arrives is an optical mark reader sheet; reading means for reading the distribution condition information stored in the first storage means based on the calling line if the judging means has found that the first page is not an optical mark reader sheet; and means for distributing the facsimile information received by the receiving means in accordance with the distribution condition information read by the reading means.

In operation, upon recognizing the designation of a push-button signal, the facsimile mail equipment at the mail center transmits to each destination the facsimile information received by the receiving means based on the push-button signal designation.

When the judging means finds that the first page of the facsimile information received by the receiving means is an optical mark reader sheet, the facsimile information is transmitted to each destination according to the instruction designated in the optical mark reader sheet.

If neither a PB signal nor an OMR sheet is designated, each destination is given for the facsimile information received by the receiving means in accordance with the distribution condition information set beforehand for each calling line. Thus according to the invention, the facsimile information received by the receiving means is transmitted to the appropriate designation regardless of PB signal-based designation, OMR sheet-based designation, or neither of the two kinds of designation being in effect.

A plurality of pieces of facsimile mail equipment may be interconnected by dedicated lines to form a communication system. In that case, facsimile information is exchanged over dedicated lines between the equipment without modifying the operating procedures at the fax machine involved.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a view showing how data are set illustratively in a line-wise set area of the distribution condition table.

DESCRIPTION OF THE PREFERRED EMBODIMENT

Figure 1:
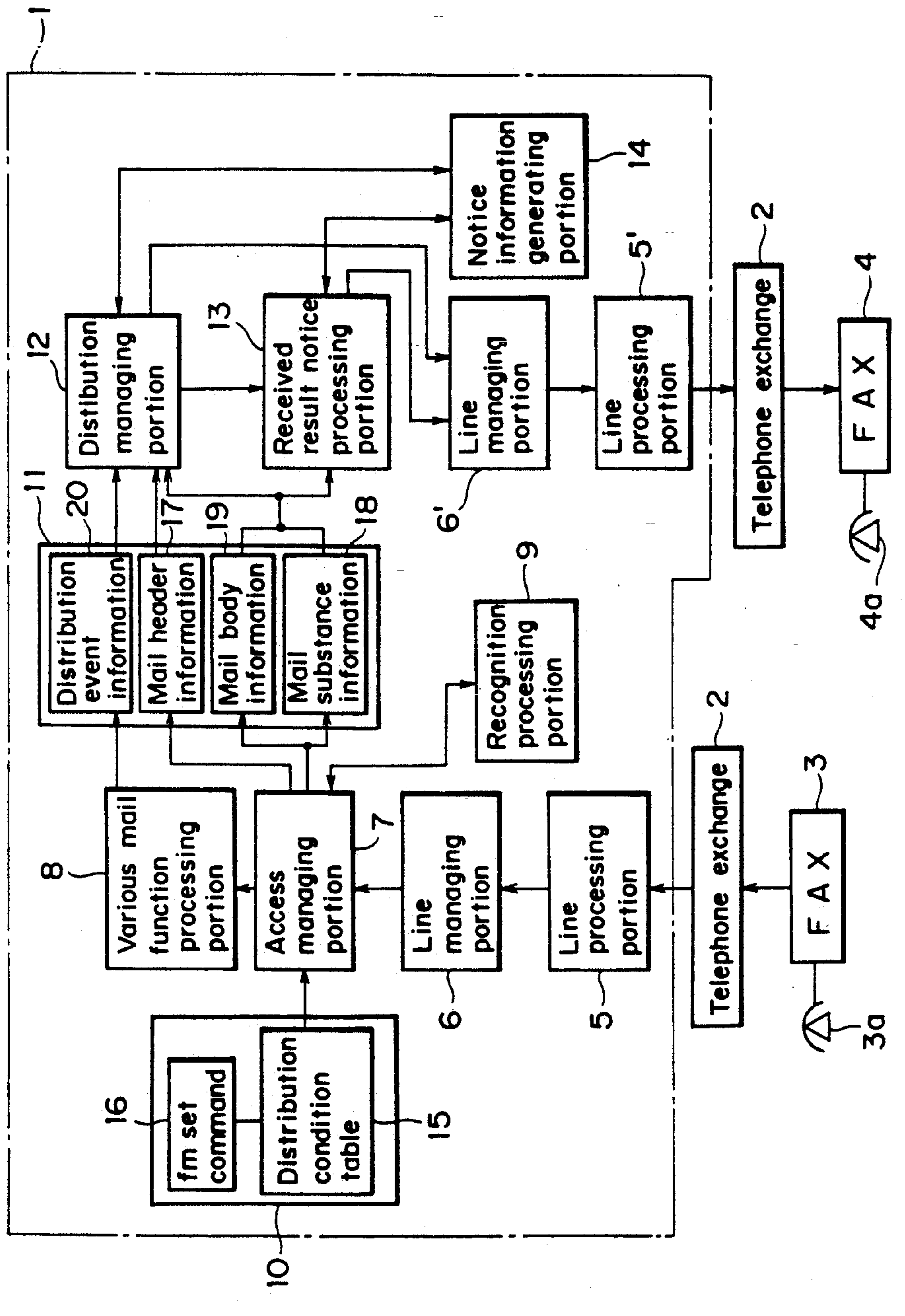
FIG. 1 is a block diagram of a facsimile mail system embodying the present invention.

A facsimile mail system embodying the invention will now be described in detail with reference to the accompanying drawings. FIG. 1 is a block diagram of this facsimile mail system. In FIG. 1, facsimile mail equipment 1 installed at a mail center is connected with fax machines 3 and 4 via a telephone exchange 2. The fax machines 3 and 4 are coupled to telephone sets 3*a* and 4*a*, respectively. Although there is actually provided only one telephone exchange 2, the exchange is shown here divided in two for illustrative expediency.

The facsimile mail equipment 1 includes line processing portions 5 and 5', line managing portions 6 and 6', an access managing portion 7, a various mail function processing portion 8, a recognition processing portion 9, magnetic disk units 10 and 11, a distribution managing portion 12, a received result notice processing portion 13, and a notice information generating portion 14. It should be noted that the line processing portions 5 and 5' are the same in function and so do the line managing portions 6 and 6'.

The line processing portion 5 performs line processing, PB signal recognition, guidance output, facsimile communication processing, OMR sheet format check, and communication history management.

The line processing involves making, receiving and terminating calls to and from the telephone exchange 2. The PB recognition refers to a process of recognizing the PB signal transmitted to the facsimile mail equipment 1 via the telephone exchange 2 when a user operates push-buttons on his telephone set attached to the fax machine 3 or 4. The guidance output means the outputting of a voice guidance to the transmitting party's telephone set 3*a* via the telephone exchange 2 when the facsimile mail equipment 1 receives a call. For example, upon receipt of a call, the line processing portion 5 outputs to the transmitting party a voice guidance such as: "This is the mail center. Please enter the number . . . " According to the guidance, the transmitting party operates push-buttons to input the appropriate number.

The facsimile communication processing refers to a process of receiving all facsimile information sent from, say, the fax machine 3. The OMR format check is a function that checks to see if the format of the received OMR sheet is correct. The communication history management is a function that manages the communication history of each of the lines installed. In practice, there are provided as many line processing portions 5 as the number of lines used. Because dozens of lines are usually connected to the telephone exchange 2, that many line processing portions 5 need to be actually installed.

When utilizing facsimile mail service, the user first dials the telephone set 3*a* to call the facsimile mail equipment 1 at the mail center. In turn, the appropriate line processing portion 5 identifies the calling line and transmits a voice guidance to the transmitting party's telephone set 3*a* via the telephone exchange 2. According to the voice guidance, the transmitting party operates the fax machine 3 to transmit facsimile information. The line processing portion 5 performs PB signal recognition and, if PB signal-based designation is recognized, allows the facsimile mail equipment 1 to execute facsimile mail service in accordance with the signal-designated conditions.

If the line processing portion 5 does not recognize any PB signal-based designation within a predetermined time after identification of the calling line, the line managing portion 6 functions to make automatic transition to OMR sheet mode.

Figure 2:
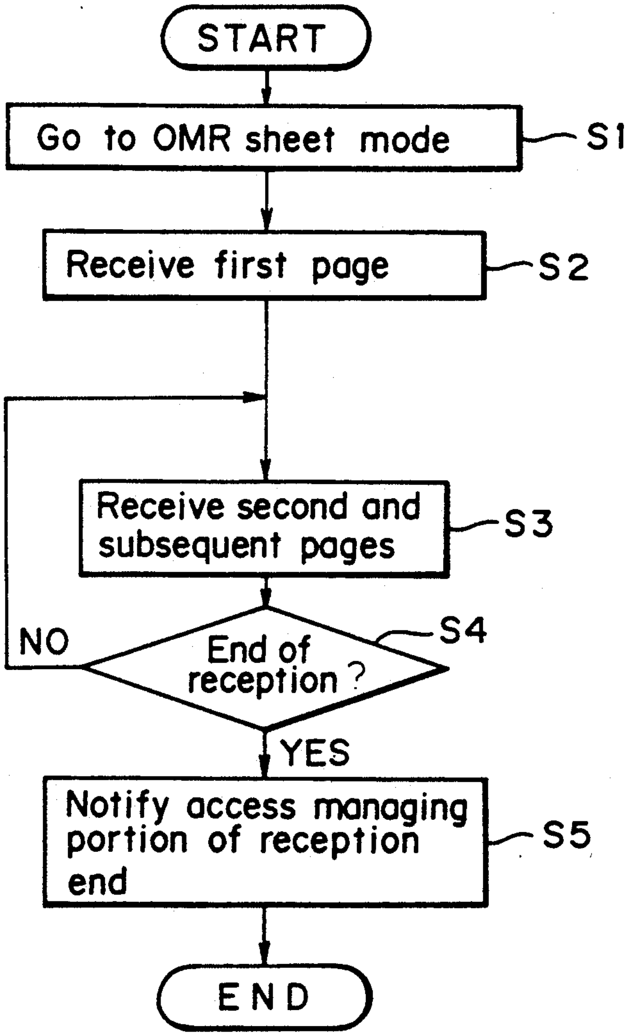
FIG. 2 is a flowchart of steps in which a line managing portion of the embodiment of FIG. 1 operates.

How the line managing portion 6 works will now be described with reference to the flowchart of FIG. 2. In step S1, a failure to recognize a PB signal within a predetermined time after receipt of the call causes automatic transition to OMR sheet mode. In step S2, the first page of facsimile information is received. In step S3, the second and subsequent pages are received.

In step S4, a check is made to see if all information has been received. If all information is found to have been received, step S5 is reached. In step S5, the access managing portion 7 is notified that all information has been received. This terminates the operation of the line managing portion 6. If step S4 finds that the reception of information is incomplete, step S3 is reached again for continued reception of information.

Figure 3:
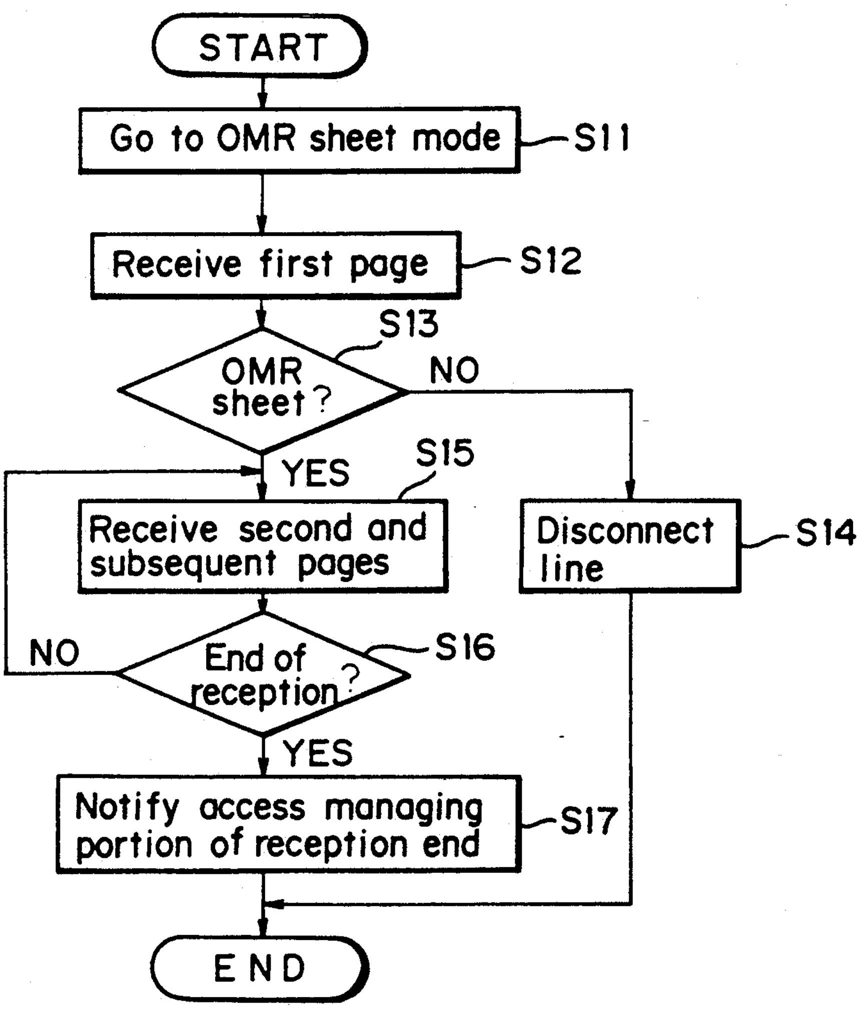
FIG. 3 is a flowchart of steps in which a conventional line managing portion operates.

To clarify some of the characteristics of the invention, how a conventional line managing portion 6 typically works will now be described with reference to the flowchart of FIG. 3. As shown in FIG. 3, conventional steps S11 and S12 correspond to steps S1 and S2 of this invention. In step S13, a check is made to see if an OMR sheet is transmitted. If no OMR sheet is found in step S13, step S14 is reached in which the line is disconnected by the line processing portion 5 under the direction of the line managing portion 6.

With the calling line disconnected, no further communication is available. That is, if unconditional facsimile information, i.e., information not furnished with PB signal- or OMR sheet-based designation is being sent, the conventional line managing portion disconnects the line and renders further communication impossible. By contrast, the line managing portion 6 of this invention makes automatic transition to OMR sheet mode if no PB signal is recognized within a predetermined time after receipt of the call so that facsimile information will be received anyway, as discussed with reference to FIG. 2. The invention thus eliminates the disadvantage of halfway-discontinued communication stipulated under constraints of the prior art.

The recognition processing portion 9 performs OMR sheet recognition processing. Specifically, when recognizing OMR sheet-based designation in the facsimile information received, the recognition processing portion 9 supplies the access managing portion 7 with all facsimile information together with the result of OMR sheet recognition.

The access managing portion 7 is a specific feature of the invention. It judges the subscriber ID (identification) and function code designated in the PB signal or OMR sheet and manages subscriber numbers and destinations. If PB signal- or OMR sheet-based designation is not found, or if instructions cannot be read from the OMR sheet, the access managing portion 7 retrieves from a distribution condition table 15 of the magnetic disk unit 10 subscriber ID's, function codes, destinations and other appropriate information for management purposes.

Figure 4:
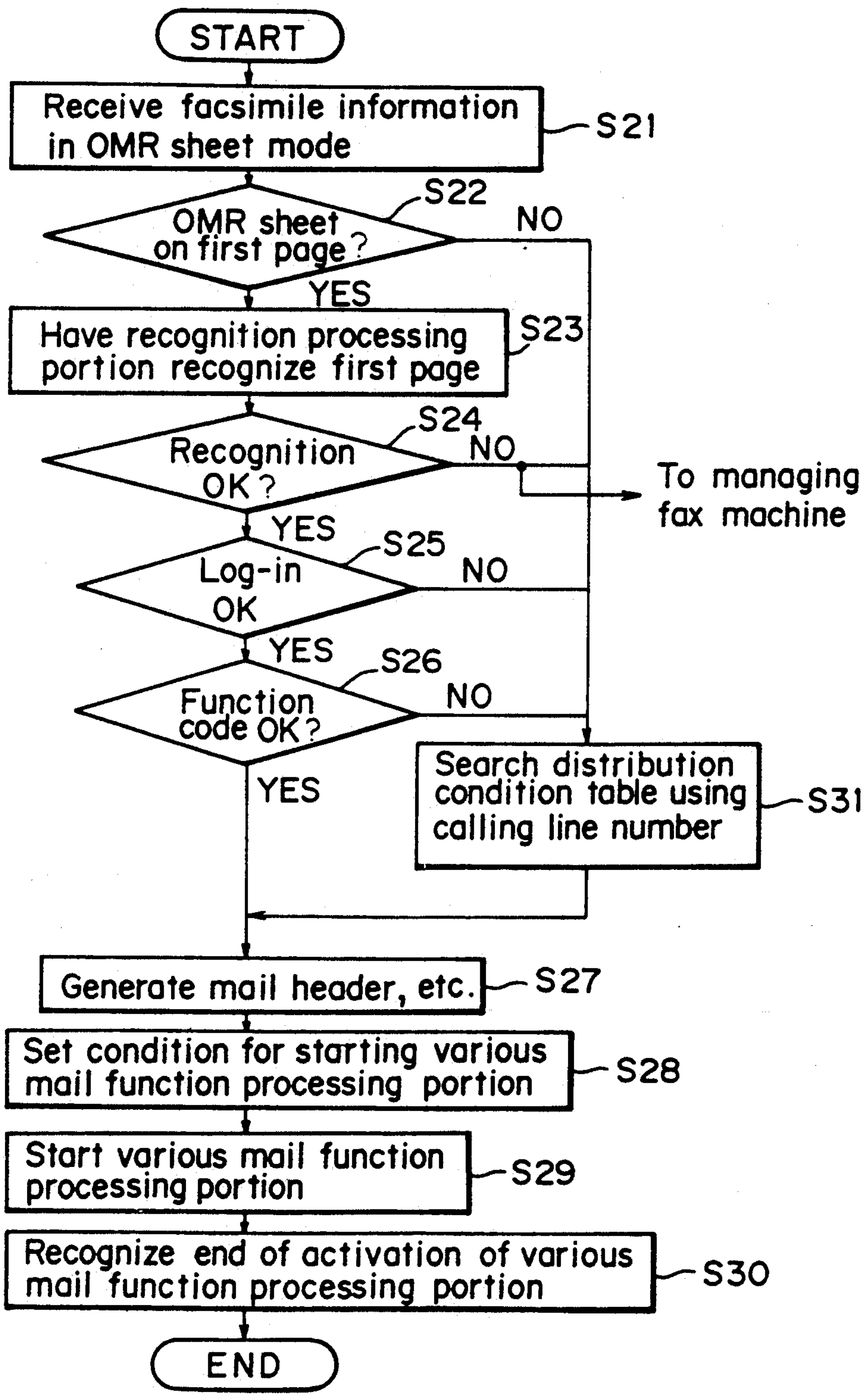
FIG. 4 is a flowchart of steps in which an access managing portion of the embodiment operates.

The flowchart of FIG. 4 depicts how the access managing portion 7 works. The steps in this flowchart apply when the access managing portion 7 receives facsimile information in OMR sheet mode.

In step S21 of FIG. 4, the facsimile mail equipment 1 receives facsimile information in OMR sheet mode. In step S22, a check is made to see if an OMR sheet is attached to the first page of the facsimile information received. If the OMR sheet is detected (a "YES" decision in step S22), step S23 is reached. In step S23, the recognition processing portion 9 recognizes the OMR sheet on the first page.

If the result of recognition by the recognition processing portion 9 is found to be affirmative (a "YES" decision) in step S24, step S25 is reached. In step S25, a check is made to see if log-in is acceptable. If log-in is judged to be acceptable in step S25, step S26 is reached. Step S26 checks to see the function code is acceptable. If the function code is found to be acceptable, step S27 is reached.

Step S27 writes to the magnetic disk unit 11 a mail header indicating mail conditions and destinations and other information. Specifically, mail header information 17, mail substance information 18 (i.e., contents of facsimile information) and mail body information 19 for managing the substance information are written temporarily to a memory, not shown, before being written to the magnetic disk unit 11.

In step S28, the conditions for starting the various mail function processing portion 8 are set in memory. The various mail function processing portion 8 provides control over transmitting facsimile information by such mail functions as broadcasting, special delivery and confidential delivery, as well as control over a bulletin board function. The bulletin board function is a function to be set for a given calling line so that the information sent unconditionally over that line is stored as a database into the magnetic disk unit 11. That database may later be accessed as needed by other users for its contents. Entry of a line in the bulletin board is also made available using PB signal- or OMR sheet-based designation.

In step S29, the various mail function processing portion 8 is activated to write to the magnetic disk unit 11 distribution event information 20 indicating the presence or absence of a transmission request. Step S30 recognizes an end of the activation of the various mail function processing portion 8. This completes the series of operations by the access managing portion 7.

If step S22 fails to find an OMR sheet on the first page of the facsimile information (a "NO" decision), step S31 is reached. The absence of the OMR sheet means the absence of designated instructions. In that case, step S31 searches through the distribution condition table 15 using the calling line number so as to identify the log-in subscriber number, function code and destination. Step S31 is followed by steps S27 through S30 which are executed as described above on the basis of the information retrieved from the table 15.

In case of a "NO" decision in step S24, S25 or S26, step S31 is also reached in which the above process is carried out. It should be noted that when a "NO" decision is made in step S24, the OMR sheet is transmitted to the managing fax machine.

With this access managing portion 7 operating in the above manner, facsimile information is transmitted according to the function code, destination and other settings in the distribution condition table 15 where neither PB signal- nor OMR sheet-based designation is provided. When a particular OMR sheet is provided but not recognized, that OMR sheet is output to the managing fax machine. This allows the OMR sheet to be verified later so that anything unusual contributing to the sheet recognition failure will be attributed to a definite party involved.

Figure 5:
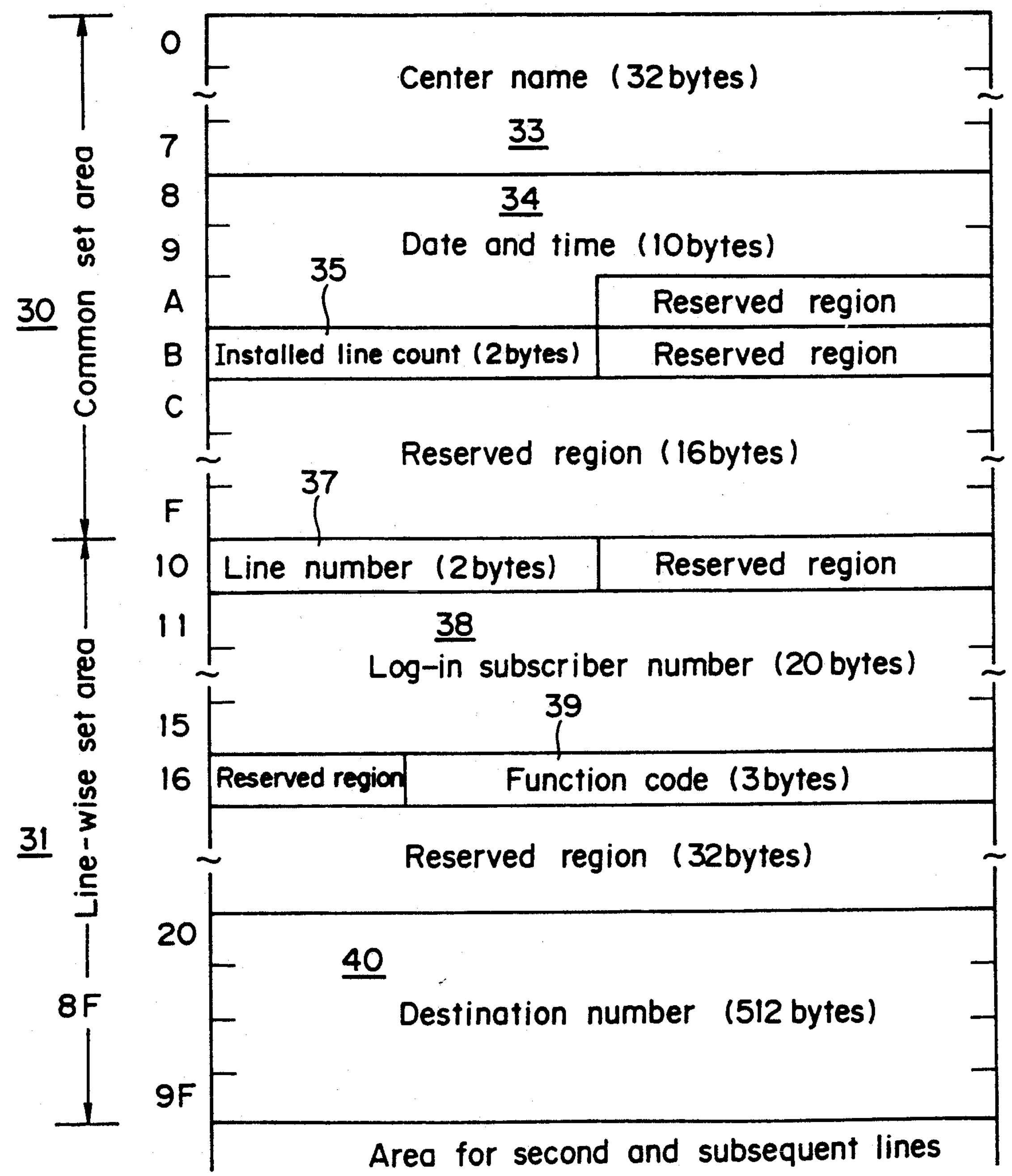
FIG. 5 is a structural view of a distribution condition table for use with the embodiment.

Below is a description of the distribution condition table 15, another feature specific to this invention, with reference to FIG. 5. The distribution condition table 15 comprises a common set area 30 and a line-wise set area 31. The common set area 30 contains a center name 33 indicating the name of the center at which the facsimile mail equipment 1 is established, a set date/time 34, an installed line count 35, and reserved regions.

As its name implies, the line-wise set area 31 is set for each of calling lines. The area 31 contains a line number 37, a log-in subscriber number 38, a function code 39, a destination number 40, and reserved regions. It is the line-wise set area 31 that is subject to the search performed in step S31 of FIG. 4.

The distribution condition table 15 is set by use of an fmset command 16. The fmset command 16 is used to establish a table (i.e., distribution condition table 15) in which facsimile information received unconditionally is assigned a log-in subscriber number, a function code and a destination corresponding to the calling line in question, whereby the facsimile information is turned into mail information. FIG. 6 gives an example in which typical values are set in the line-wise set area 31 of the distribution condition table 15 of FIG. 5.

Referring again to FIG. 1, the distribution managing portion 12 reads distribution event information 20 to ascertain the presence of the mail to be distributed. When the mail is found to be present, the mail is distributed to its destination in accordance with the transmitting condition (e.g., special delivery, confidential delivery, etc.) and the destination written in the mail. The mail to be distributed is constituted by body information 19 and substance information 18. The body information indicates the location in which the information is to be stored, and the substance information is the information proper, as its name implies.

If conditions are set so that an invoice (containing a destination and name of transmitting party) is automatically attached to facsimile information, the distribution managing portion 12 acquires from the mail header 17 the name and department of the destination, the transmitting party's name and department, the number of sheets of document and the date of receipt. Then the notice information generating portion 14 converts these pieces of information from code to image format and attaches the information to the mail to be distributed.

The received result notice processing portion 13 performs two processes: notifying the transmitting party of the result of mail receipt (i.e., date, sheet count, destination, etc.), and notifying the same transmitting party of the result of distribution processing (i.e., date, sheet count, result of distribution to each destination, etc.) These pieces of information are acquired from the mail header information 17 and are converted from code to image format at the time of transmission to a fax machine. Information acquisition and conversion to image format are carried out by the notice information generating portion 14.

Thereafter, the facsimile information is transmitted to the destination fax machine 4 via the line managing portion 6', line processing portion 5' and telephone exchange 2.

As many apparently different embodiments of this invention may be made without departing from the spirit and scope thereof, it is to be understood that the invention is not limited to the specific embodiments thereof except as defined in the appended claims.

What is claimed is:

1. A facsimile mail system having mail center equipment, a plurality of telephone sets connected to said mail center equipment via lines and a telephone exchange, and a plurality of facsimile machines each connected to said respective telephone sets, said facsimile mail system comprising:

means for setting beforehand distribution condition information for facsimile information received per calling line;

first storage means for storing said distribution condition information;

means for recognizing a calling line;

push-button signal recognizing means for recognizing push-button signal designation made by a telephone set;

means for making automatic transition to optical mark reader sheet mode when said push-button signal recognizing means does not recognize any push-button signal designation within a predetermined time;

recognition processing means for performing optical mark reader sheet recognition processing;

receiving means for receiving said facsimile information;

judging means for checking to see if, with said facsimile information received in full, the first page that arrives is an optical mark reader sheet;

reading means for reading said distribution condition information stored in said first storage means based on said calling line if said judging means has found that the first page is not an optical mark reader sheet;

means for distributing said facsimile information received by said receiving means in accordance with said distribution condition information read by said reading means;

means for transmitting, when said push-button signal recognizing means recognizes push-button signal-based designation, said facsimile information received by said receiving means to each appropriate destination according to the instructions designated by the push-button signal; and means for transmitting, when said judging means finds that the first page of said facsimile information received by said receiving means is an optical mark reader sheet, said facsimile information to each appropriate destination according to the instructions of said optical mark reader sheet.

2. A facsimile mail system according to claim 1, further comprising mail function processing means for providing control over transmitting said facsimile information received by said receiving means through the use of a mail function selected from a plurality of mail functions.

3. A facsimile mail system having mail center equipment, a plurality of telephone sets connected to said mail center equipment via lines and a telephone exchange, and a plurality of facsimile machines each connected to said respective telephone sets, said facsimile mail system comprising:

means for setting beforehand distribution condition information for facsimile information received per calling line;

first storage means for storing said distribution condition information;

means for recognizing a calling line;

push-button signal recognizing means for recognizing push-button signal designation made by a telephone set;

means for making automatic transition to optical mark reader sheet mode when said push-button signal recognizing means does not recognize any push-button signal designation within a predetermined time;

recognition processing means for performing optical mark reader sheet recognition processing;

receiving means for receiving said facsimile information;

judging means for checking to see if, with said facsimile information received in full, the first page that arrives is an optical mark reader sheet;

reading means for reading said distribution condition information stored in said first storage means based on said calling line if said judging means has found that the first page is not an optical mark reader sheet;

means for distributing said facsimile information received by said receiving means in accordance with said distribution condition information read by said reading means;

mail function processing means for providing control over transmitting said facsimile information received by said receiving means through the use of a mail function selected from a plurality of mail function;

means for transmitting, when said judging means finds that the first page of said facsimile information received by said receiving means is an optical mark reader sheet, said facsimile information to each appropriate destination according to the instructions of said optical mark reader sheet and through the use of the mail function designated by said optical mark reader sheet;

a managing facsimile machine; and means for outputting, when the result of optical mark reader sheet recognition processing by said recognition processing means is unacceptable, all facsimile information received by said receiving means to said managing facsimile machine.

4. A facsimile mail system having mail center equipment, a plurality of telephone sets connected to said mail center equipment via lines and a telephone exchange, and a plurality of facsimile machines each connected to said respective telephone sets, said facsimile mail system comprising:

means for setting beforehand distribution condition information for facsimile information received per calling line;

first storage means for storing said distribution condition information;

means for recognizing a calling line;

push-button signal recognizing means for recognizing push-button signal designation made by a telephone set;

means for making automatic transition to optical mark reader sheet mode when said push-button signal recognizing means does not recognize any push-button signal designation within a predetermined time;

recognition processing means for performing optical mark reader sheet recognition processing;

receiving means for receiving said facsimile information;

judging means for checking to see if, with said facsimile information received in full, the first page that arrives is an optical mark reader sheet;

reading means for reading said distribution condition information stored in said first storage means based on said calling line if said judging means has found that the first page is not an optical mark reader sheet; and means for distributing said facsimile information received by said receiving means in accordance with said distribution condition information read by said reading means;

wherein said distribution condition information is stored in said first storage means in the form of a distribution condition table including a common set area and a line-wise set area;

said common set area containing a mail center name, an information set data/time, and an information set line count; and said line-wise set area containing a line number, a log-in subscriber number, a function code and a destination number as said distribution condition information.

5. A facsimile mail system according to claim 4, wherein said distribution condition information is read from a line-wise set area in said distribution condition table, said line-wise set area corresponding to the line over which facsimile information is received.

6. A facsimile mail system having mail center equipment, a plurality of telephone sets connected to said mail center equipment via lines and a telephone exchange, and a plurality of facsimile machines each connected to said respective telephone sets, said facsimile mail system comprising:

means for setting beforehand distribution condition information for facsimile information received per calling line;

first storage means for storing said distribution condition information;

means for recognizing a calling line;

push-button signal recognizing means for recognizing push-button signal designation made by a telephone set;

means for making automatic transition to optical mark reader sheet mode when said push-button signal recognizing means does not recognize any push-button signal designation within a predetermined time;

recognition processing means for performing optical mark reader sheet recognition processing;

receiving means for receiving said facsimile information;

judging means for checking to see if, with said facsimile information received in full, the first page that arrives is an optical mark reader sheet;

reading means for reading said distribution condition information stored in said first storage means based on said calling line if said judging means has found that the first page is not an optical mark reader sheet;

means for distributing said facsimile information received by said receiving means in accordance with said distribution condition information read by said reading means;

mail function processing means for providing control over transmitting said facsimile information received by said receiving means through the use of a mail function selected from a plurality of mail functions; and second storage means for storing distribution condition information read by said reading means as well as facsimile information received by said receiving means;

wherein said mail function processing means includes a bulletin board function to place into said second storage means facsimile information as a data base when said facsimile information is received without any one of push-button signal designation and optical mark reader sheet designation.

* * * * *